May 19, 1959     M. M. OWEN     2,887,168
EARTH WORKING IMPLEMENT
Filed Aug. 16, 1955     3 Sheets-Sheet 3
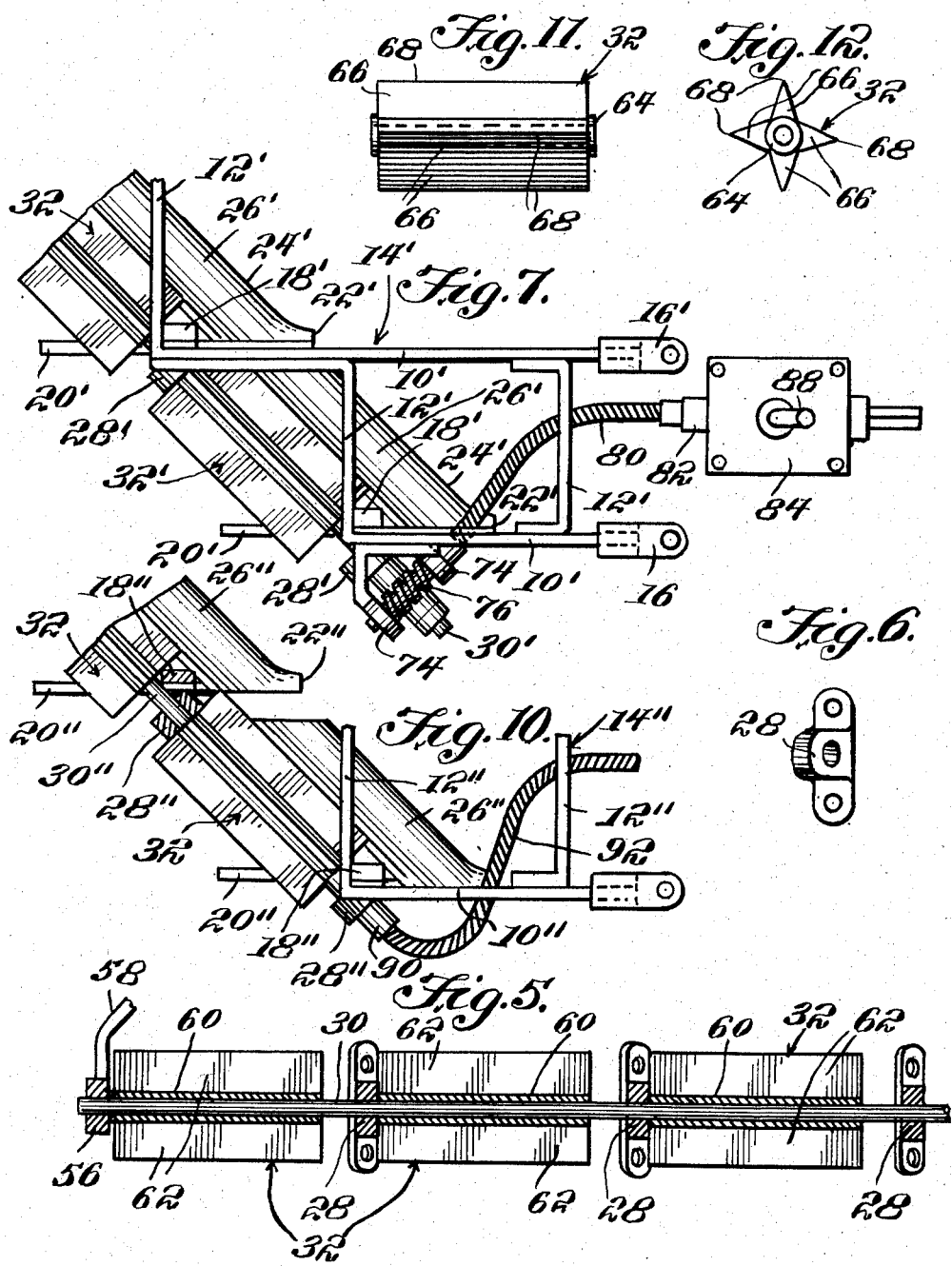
INVENTOR.
Manly M. Owen
BY
McMorrow, Berman & Davidson
ATTORNEYS United States Patent Office 2,887,168
Patented May 19, 1959

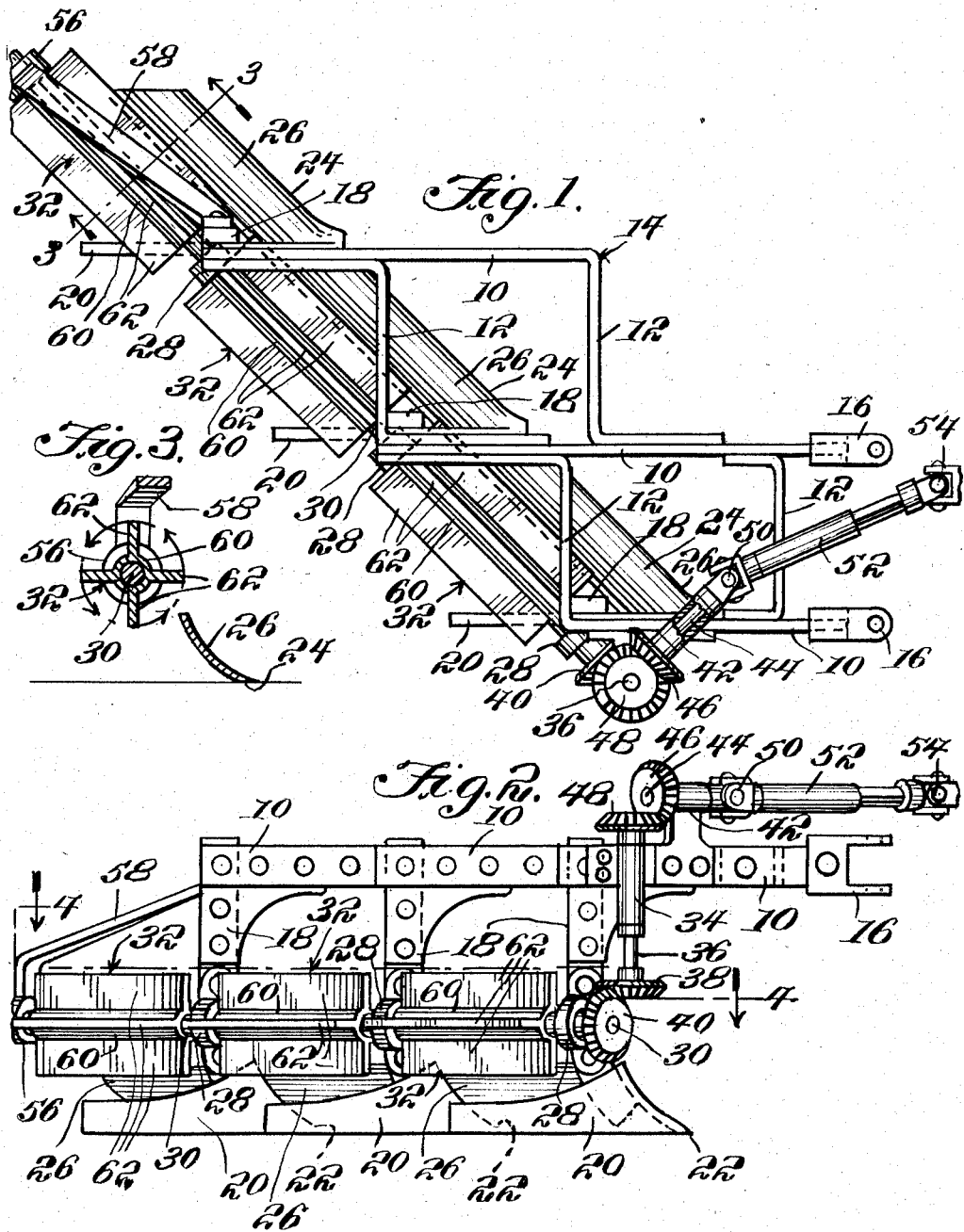

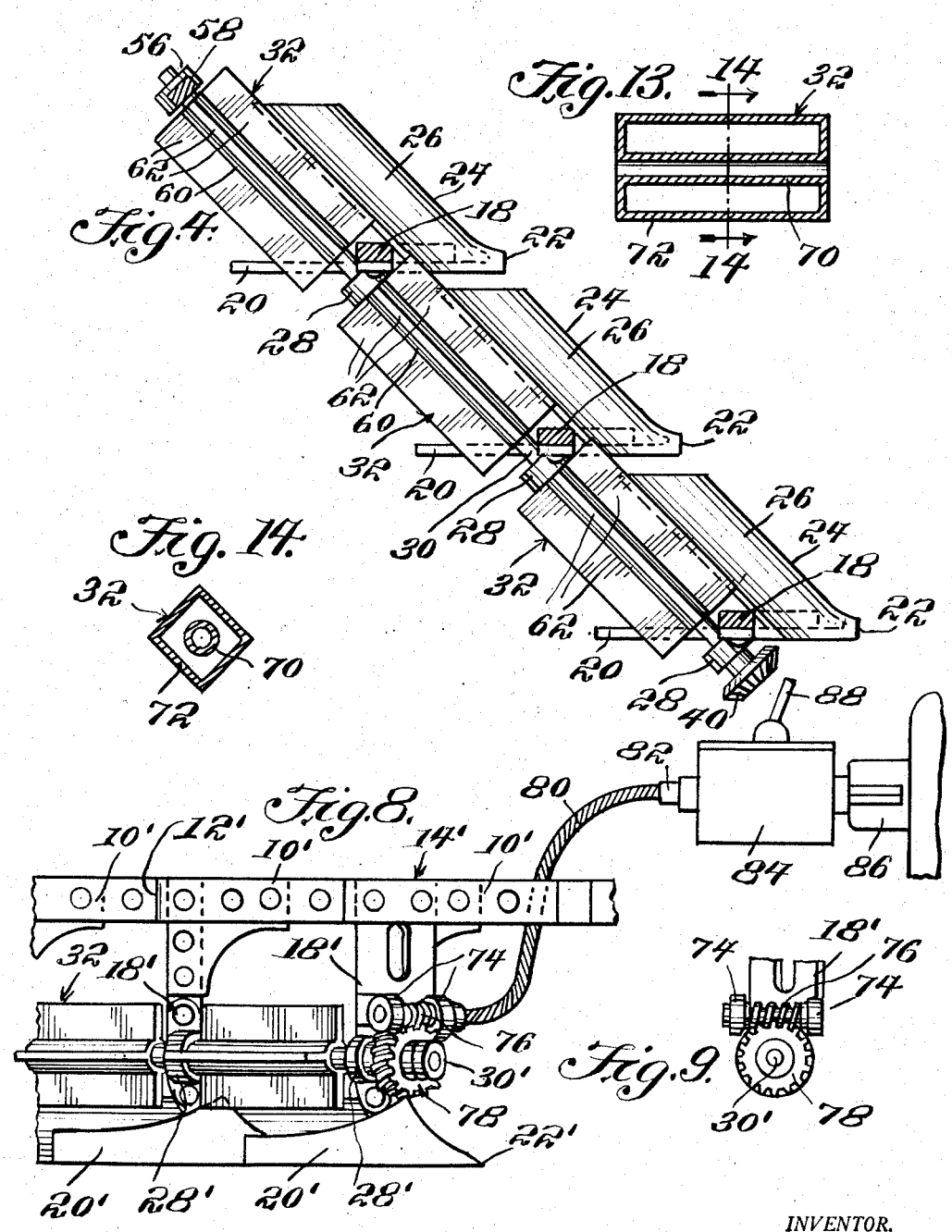

2,887,168

EARTH WORKING IMPLEMENT

Manly M. Owen, Watertown, S. Dak.

Application August 16, 1955, Serial No. 528,615

3 Claims. (Cl. 172—67)

This invention relates to an earth working implement and has for its primary object to scour and clean the soil.

Another object is to lift a layer of top soil and subsequently elevate and transfer it to the surface from which it was lifted while subjecting it to a scouring and cleaning operation.

A further object is to invert the layer of soil so that any straw or foliage will lie beneath the surface.

A still further object is to loosen and break up the soil, leaving the straw or foliage on the top of the plowed surface to act as a mulch.

The above and other objects may be attained by employing this invention which embodies among its features spaced parallel plow beams, plow shares carried by the plow beams and extending downwardly therefrom, earth breaking points carried by the plow shares and lying along a common plane which extends diagonally across the implement, earth lifting blades carried by the plow shares and extending therebetween adjacent the points thereof, earth working rotors carried by the plow beams for rotation immediately above the rear edges of the blades and about a common axis which lies parallel to the common plane, and means carried by the implement and operatively connected to the rotors for rotating them as the implement advances.

Other features include means for regulating the vertical position of the rotors with relation to the lifting blades.

Still other features include demountably holding the rotors on the drive shaft so that rotors of selected cross section may be substituted and interchanged with other rotors.

In the drawings:

Figure 1 is a top plan view of an earth working implement embodying the features of this invention;

Figure 2 is a side view of the implement illustrated in Figure 1;

Figure 3 is a transverse sectional view taken substantially on the line 3—3 of Figure 1;

Figure 4 is a horizontal sectional view taken substantially on the line 4—4 of Figure 2;

Figure 5 is a fragmentary vertical sectional view through the rotors of one type showing them mounted on the drive shaft;

Figure 6 is a perspective view of one of the drive shaft bearings;

Figure 7 is a fragmentary top plan view of an earth working implement embodying the features of this invention and illustrating a type of drive that differs from that illustrated in Figure 1;

Figure 8 is a fragmentary side view of Figure 7;

Figure 9 is a fragmentary end view of the drive illustrated in Figure 7;

Figure 10 is a view similar to Figure 7, showing a further modified form of drive;

Figure 11 is a fragmentary side view of one form of earth working rotor;

Figure 12 is an end view of Figure 11;

Figure 13 is a longitudinal sectional view through a modified form of rotor; and Figure 14 is a transverse sectional view taken substantially on the line 14—14 of Figure 13.

Referring to the drawings in detail, the illustrated earth working implement comprises laterally spaced parallel longitudinal plow beams 10 which are joined together by cross members 12 to define a diagonally extending frame designated generally 14. A pair of inboard plow beams 10 which lie in advance of the other plow beams are equipped with conventional coupling clevises on their forward ends which are adapted to be coupled to a farm tractor in a conventional manner. Carried by the rear ends of plow beams 10 are depending arms 18 carrying at their lower ends plow shares 20 which are longitudinally elongated and extend behind the plow beams 10 and also parallel to the line of draft of the plow. The plow shares 20 have on their forward ends earth breaking points 22. Carried by the forward portions of the plow shares 20 and extending diagonally with their forward sharpened edges 24 disposed in a common plane are earth lifting blades 26 having concave front faces disposed to elevate a layer of earth or top soil severed from the subsoil by the sharpened edges 24.

Mounted on the depending arms 18 of the plow beams 10 adjacent but slightly above the shares 20 and behind the blades 26 are bearings 28 in which is mounted for rotation a drive shaft 30 which carries a rotor 32 between each pair of adjacent beams.

Carried by the inboardmost plow beam 10 is a vertical sleeve 34 in which is mounted for rotation a jack shaft 36. On the lower end of the jack shaft 36 is a bevel pinion 38 which meshes with a bevel pinion 40 which is secured to the shaft 30 so that when the pinion 38 is rotated, the drive shaft 30 will be rotated simultaneously. A bearing 42 is carried by the inboardmost plow beam 10 and extends upwardly therefrom near the sleeve 34 and journalled in said bearing for rotation adjacent the upper end is a stub shaft 44 carrying on its rear end a bevel pinion 46 which meshes with a beveled pinion 48 on the upper end of the shaft 36. Coupled through a universal joint 50 to the forward end of the stub shaft 44 is an extendable drive shaft 52 which is adapted to be connected through the medium of a universal coupling 54 to the power take-off of the farm tractor. As illustrated in Figures 1 and 2, the outboardmost bearing bracket 56 in which the shaft 30 is journalled is supported on an outwardly extending bracket arm 58 carried by the outboardmost plow beam 10.

From the foregoing, it will be evident that as the drive shaft 52 is rotated by the power take-off of the tractor to which the device is coupled, the rotor shaft 30 will be rotated so as to cause the rotors 32 to engage earth lifted by the earth lifting blades 26 to either turn the soil over and mix the straw and foliage with the soil, turn the soil over to cover most of the straw or foliage and break up lumps, or to deposit the soil so that the roots or straw lie on top of the ground to serve as a mulch which will retain the moisture in the ground and protect the soil from wind and evaporation.

The type of rotor 32, illustrated in Figure 3, comprises a hub 60 which is secured to the shaft 30 and carries radial blades 62 which, when rotated in the direction of the arrows illustrated in Figure 3, elevate soil lifted by the earth lifting blades 26 and carry it upwardly to and deposit its soil upside down behind the earth lifting blade. With the type of rotor 32, illustrated in Figures 11 and 12, a hub 64 carries radial blades 66 which taper as they recede from the axis of the hub to define sharpened edges 68. The blades 66 tend to turn the soil over and mix the straw and foliage with the soil while pulverizing the soil. Both the rotor 32, illustrated in Figure 3, and the rotor 32, illustrated in Figures 11 and 12, are adapted to rotate in the direction of the arrows illustrated in Figure 3, though it is obvious that they may be rotated in the opposite direction to perform special earth working operations. When using the type of rotor 32, illustrated in Figure 7, which comprises a tubular hub 70 which is surrounded by a transversely square drum 72, the shaft 30 to which the rotors 32, illustrated in Figure 13, are attached is rotated in a clockwise direction when viewed, as illustrated in Figure 3, to leave the foliage or straw on top of the ground by the simple expedient of raising the shaft 30 to a selected height above the earth lifting blade 26.

In the modified form of the invention, illustrated in Figures 7 and 8, the implement frame designated generally 14' comprises parallel plow beams 10' joined by cross members 12' and like the frame 14, previously described, carries coupling clevises 16' by means of which the implement 14 is connected to a conventional farm tractor having a conventional power take-off. Like the plow beams 10, previously referred to, the plow beams 10' are provided with depending arms 18' carrying adjacent their lower ends plow shares 20' conforming in all respects to the plow shares 20, previously described. As in the previously described structure, the plow shares 20' carry at their forward ends earth breaking points 22' which, as previously described, lie along a common plane which extends diagonally across the frame 14. Earth lifting blades 26' are carried by the plow shares 22' and extend diagonally across the frame 14' adjacent the common plane with their lowered sharpened edges 24' disposed toward the front of the implement. Mounted in suitable brackets 28' carried by the arms 18' is a drive shaft 30' which lies in spaced parallel relation to the common plane diagonally across the machine, as will be readily understood upon reference to the drawings.

Carried by the endmost depending arm 18 adjacent the foremost plow beam 10' and spaced supporting brackets 74 is a worm 76 and carried by the shaft 30' immediately beneath the worm 76 is a worm gear 78. The worm 76 is connected through a conventional flexible shaft 80 with the output shaft 82 of a change speed gearing housed within the housing 84 carried by the farm tractor. The input shaft (not shown) of the change speed gear train is coupled to the power take-off 86 of the tractor and the gear selection is controlled by a conventional hand lever 88. It is to be understood, of course, that the transmission will include, in addition to several forward speeds, a gear change by means of which the rotation of the shaft 30' may be reversed.

In the further modification of the invention, illustrated in Figure 10, the plow beams are designated 10" and are coupled by the cross bars 12", as previously described. Also, as previously set forth, the plow beams are provided with the depending arms 18" conforming in all respects to the depending arms 18 which carry the aligned bearings 28" which correspond in all respects to the bearings 28, illustrated in Figures 1 and 2. A drive shaft 30" is mounted in the bearings 28" to rotate about an axis which lies diagonally across the frame 14" and carries at its end adjacent the most advanced plow beam 10" a coupling 90 by means of which a flexible shaft 92 corresponding in all respects to the flexible shaft 80 may transmit rotation to the shaft 30". As in the structures previously described, the arms 18" carry at their lower ends parallel plow shares 20" which, like the plow shares previously described are provided with earth breaking points 22" which lie along a common plane which lies diagonally of the frame 14" and carried by the plow shares are earth lifting blades 26" corresponding in all respects to the blades 26 previously described. Obviously, owing to the interchangeability of the rotors 36, a selected set of rotors may be coupled to the drive shaft 30" and upon connecting the flexible shaft 92 to a conventional power transmission (not shown) the drive shaft 30" may be driven at selected speeds and either forward or reversed according to the wishes of the user.

Obviously, in use, the device may be made to prepare soil for planting, for mulching soil and for generally lifting and turning the top soil as in a conventional plowing operation. It is obvious that the modified forms of the invention may perform the functions described for the preferred form of the invention and a simple and easily operated instrument is provided.

It is obvious that the universal joint may be coupled through a speed changing and reversing transmission to the power take-off of the tractor.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. An earth working implement, a plow beam assembly having an outboard end and an inboard end, brackets depending from said beam assembly and spaced from each other therealong, plow shares individually mounted on said brackets, said plow shares having soil lifting blades elongated longitudinally of the beam assembly and projecting from the outboard sides of the plow shares, said blades having elevated rear ends, bearings on said brackets above said blades, a rotor shaft journalled in said bearings and having an inboard end, an elongated rotor fixed on said rotor shaft behind and above each of said soil lifting blades, said plowshares being rearwardly staggered relative to each other in an outboard direction at an outboard angle relative to the line of movement of the implement with the rotors aligned with each other at a similar angle.

2. In an earth working implement, a plow beam assembly having an inboard end and an outboard end, brackets spaced along and depending from said assembly, a plow share fixed to each of said brackets, said plow shares having inboard ends, soil lifting blades on the inboard ends of the plow shares having portions extending longitudinally of the line of movement of the implement and having concave portions extending rearwardly and upwardly from the plow shares, said concave portions having elevated ends, whereby soil is moved upwardly and in an outboard direction by the plow shares on forward movement of the implement, bearings on said brackets above the plow shares, a rotor shaft journaled in said bearings and extending lengthwise of the beam assembly, rotors fixed on said shaft between adjacent brackets, said rotors having radial blades which are elongated relative to the shaft, said plowshares being rearwardly staggered relative to each other in an outboard direction at an outboard angle relative to the line of movement of the implement with the rotors aligned with each other at a similar angle.

3. In an earth working implement, a plow beam assembly having an inboard end and an outboard end, bracket spaced along and depending from said assembly, a plow share fixed to each of said brackets, said plow shares having inboard ends, soil lifting blades on the inboard ends of the plow shares having portions extending longitudinally of the line of movement of the implement and having concave portions extending rearwardly and upwardly from the plow shares, said concave portions having elevated ends, whereby soil is moved upwardly and in an outboard direction by the plow shares on forward movement of the implement, bearings on said brackets above the plow shares, a rotor shaft journaled in said bearings and extending lengthwise of the beam assembly, rotors fixed on said shaft between adjacent brackets, said rotors having radial blades which are elongated relative to the shaft, said rotors being positioned to the rear of the elevated edges of the concave portions of the soil lifting blades and above the plow shares, and driving means for said shaft on the inboard end of the beam assembly, said plow shares being rearwardly staggered relative to each other in an outboard direction at an outboard angle relative to the line of movement of the implement with the rotors aligned with each other at a similar angle.

References Cited in the file of this patent

UNITED STATES PATENTS

| | | |
|---|---|---|
| 1,392,845 | Merrill | Oct. 4, 1921 |
| 1,395,370 | Tate | Nov. 1, 1921 |
| 1,485,819 | Shields | Mar. 4, 1924 |
| 2,244,538 | Kasten | June 3, 1941 |
| 2,711,125 | Szymczak | June 21, 1955 |